United States Patent [19]
Perttunen et al.

[11] Patent Number: 5,939,699
[45] Date of Patent: Aug. 17, 1999

[54] BAR CODE DISPLAY APPARATUS

[75] Inventors: Cary D. Perttunen, Shelby Township, Mich.; George N. Maracas, Phoenix, Ariz.; William L. Reber, Rolling Meadows, Ill.

[73] Assignee: Motorola, Inc., Schaumburg, Ill.

[21] Appl. No.: 08/864,135

[22] Filed: May 28, 1997

[51] Int. Cl.⁶ ........................................ G06K 7/10
[52] U.S. Cl. .......................... 235/462.01; 235/487
[58] Field of Search .................... 235/462.01, 378, 235/383, 385, 466, 492, 487; 345/123, 56

[56] References Cited

U.S. PATENT DOCUMENTS

| | | | |
|---|---|---|---|
| 4,358,761 | 11/1982 | Iwasaki | 340/792 |
| 4,667,087 | 5/1987 | Quintana | 235/380 |
| 4,868,376 | 9/1989 | Lessin et al. | 235/492 |
| 5,166,499 | 11/1992 | Holland et al. | 235/376 |
| 5,450,491 | 9/1995 | McNair | 380/25 |
| 5,594,493 | 1/1997 | Nemirofsky | 235/380 |
| 5,789,732 | 8/1998 | McMahon et al. | 235/487 |

FOREIGN PATENT DOCUMENTS 401229390  3/1988  Japan ................................ 235/487

*Primary Examiner*—Donald Hajec
*Assistant Examiner*—Diane I. Lee
*Attorney, Agent, or Firm*—Jeffrey G. Toler; James E. Gauger

[57] ABSTRACT

A bar code display apparatus includes a time-varying nonpredictable code generator (12) and a display device (14) responsive to the time-varying nonpredictable code generator (12) to display a time-varying nonpredictable bar code. The display device can provide a scrolling display by displaying a subsequent bar code portion having a bar removed from an end of the bar code. Alternatively, the display device can display a pulsed signal corresponding to the bar code. A housing, having an inset portion at which the display device is accessible, can support the time-varying nonpredictable code generator and the display device.

6 Claims, 4 Drawing Sheets

5,939,699

BAR CODE DISPLAY APPARATUS

RELATED APPLICATIONS

The present application is related to the following applications:

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 08/732,956, filed Oct. 17, 1996;

"Method, System, and Article of Manufacture for Producing a Network Navigation Device", having and Ser. No. 08/744,338, filed Nov. 7, 1996; and "Transaction Methods, Systems, and Devices", having Ser. No. 08/058,184, filed May 28, 1997.

The subject matter of the above-identified related applications is hereby incorporated by reference into the disclosure of this application.

TECHNICAL FIELD

The present invention relates to devices which display a bar code.

BACKGROUND OF THE INVENTION

A one-dimensional bar code symbol comprises a series of parallel, adjacent bars and spaces indicative of data such as a numeric character or an alphanumeric character. Data, such as a series of characters, is encoded in accordance with a bar code standard to form a bar code representation comprised of a plurality of bar code symbols. Typically, the bar code representation is printed onto paper or plastic for subsequent reading.

To read information contained in the bar code representation, a scanning device such as a wand is moved across a plurality of symbols from one side to another. As the bar code is scanned, the width pattern of the bars and spaces is processed by a computer or a like processing apparatus to recover the data encoded therein.

By printing the bar code representation to paper, cardboard, or plastic, the data encoded thereby cannot be easily modified or changed.

BRIEF DESCRIPTION OF THE DRAWINGS

The invention is pointed out with particularity in the appended claims. However, other features of the invention will become more apparent by referring to the following detailed description in conjunction with the accompanying drawings in which:

DETAILED DESCRIPTION OF A PREFERRED EMBODIMENT

The various embodiments of the present invention provide electronically modifiable bar code displays. This allows bar codes to be periodically updated to encode updated data. A bar code scrolling display or a bar code pulsing display can be included to communicate a bar code to a bar code reader having a fixed location.

Figure 1:
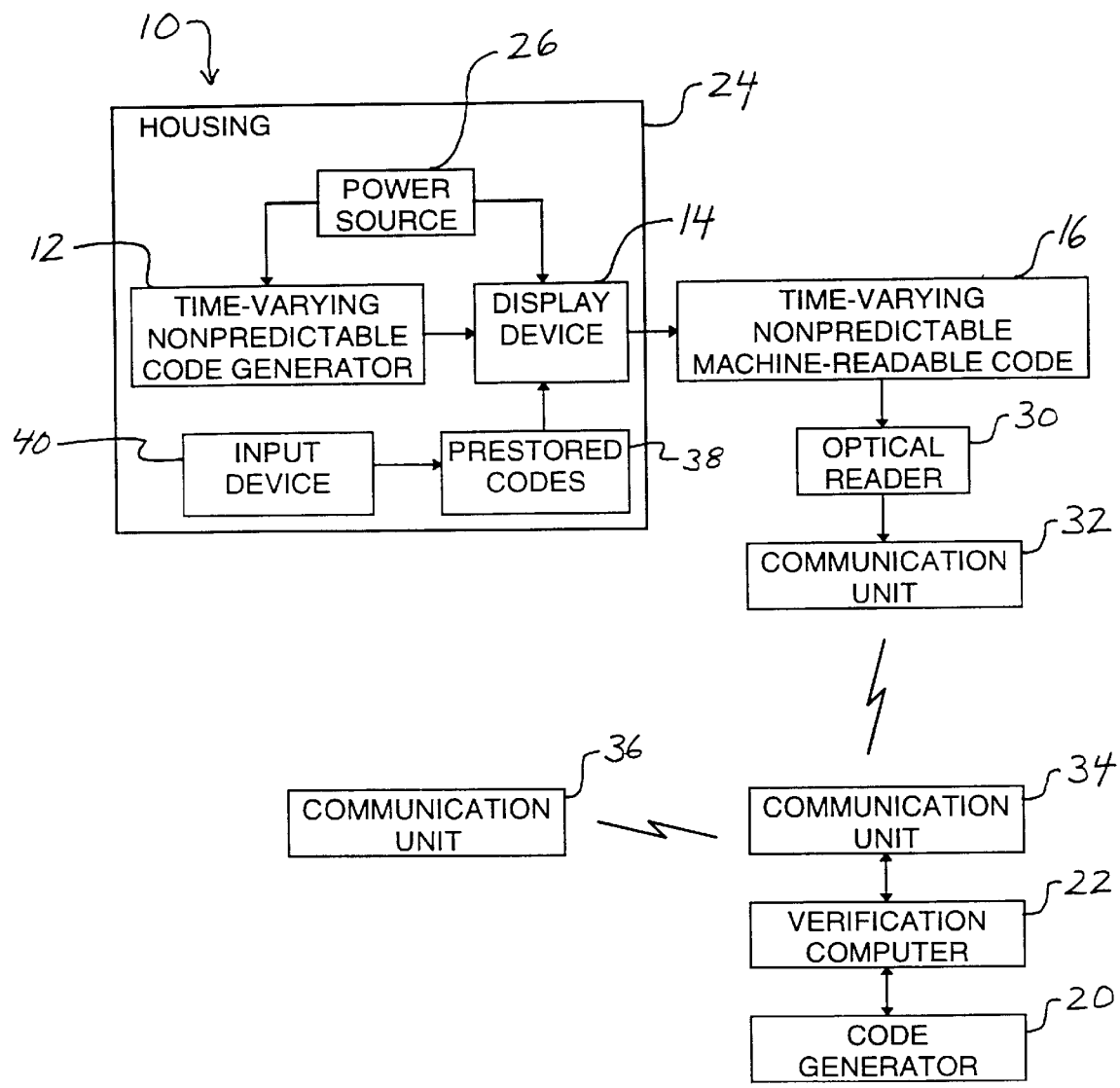
FIG. 1 is a block diagram of an embodiment of a code display apparatus in accordance with the present invention.

FIG. 1 is a block diagram of an embodiment of a code display apparatus 10 in accordance with the present invention. The code display apparatus 10 includes a time-varying nonpredictable code generator 12 and a display device 14. The display device 14 is responsive to the time-varying nonpredictable code generator 12 to display a time-varying nonpredictable machine-readable code 16.

Preferably, the time-varying nonpredictable code generator 12 includes any of the code generators described in U.S. Pat. Nos. 4,599,489, 4,720,860, and 5,168,520 which are hereby incorporated by reference into this disclosure. Optionally, the time-varying nonpredictable code generator 12 is synchronized to a second code generator 20 associated with a verification computer 22.

Generally, the time-varying nonpredictable code generator 12 generates a nonpredictable code using either a random process or a pseudorandom process. The time-varying nonpredictable code generator 12 can include an electrical component which exhibits a random process such as a noise process. Examples of the electrical component include but are not limited to a resistor, a semiconductor, and components with a semiconductor junction such as a diode or a transistor. A quantity associated with the random process is measured or sensed, and then converted to the nonpredictable code. For example, a voltage, a current, a frequency, or a period associated with the electrical component can be measured or sensed to form the nonpredictable code. The process of forming a nonpredictable code can be repeated over time to form a plurality of nonpredictable codes which vary over time.

In one random process embodiment, the electrical component includes semi-insulating gallium arsenide. In response to an applied DC voltage, this material exhibits a current which oscillates in a chaotic manner. The current is both time-varying and temperature-varying. The nonpredictable code is based upon a measured period or a measured frequency of the current.

Alternatively, the time-varying nonpredictable code generator 12 can include a processor which performs a series of steps in accordance with a pseudorandom process. The term "pseudorandom" describes entities that are selected by a definite computational process, but that satisfy one or more standard tests for statistical randomness. Preferably, the processor executes a pseudorandom sequence generator routine, such as a pseudorandom number generator routine, to form the nonpredictable code. The pseudorandom process for generating the nonpredictable code can be repeated over time to form a plurality of nonpredictable codes which vary over time. Examples of processors to execute the pseudorandom process include but are not limited to a microprocessor, an application-specific integrated circuit, a custom integrated circuit, or the like.

Preferably, the time-varying nonpredictable machine-readable code 16 includes a time-varying nonpredictable bar code such as a one-dimensional bar code or a two-dimensional bar code. A time-varying nonpredictable bar code can be formed by converting a series of numeric characters or a series of alphanumeric characters to a bar code representation in accordance with a bar code standard. Examples of bar code standards for displaying a one-dimensional bar code include but are not limited to, 3 of 9, UPC-A, UPC-E, Code 128, Codabar, MSI, Extended 3 of 9, Code 93, Extended Code 93, Industrial 2 of 5, Standard 2 of 5, Code 11, EAN/JAN-8, EAN/JAN-13, and UCC-128. Examples of bar code standards for displaying a two-dimensional bar code include, but are not limited to, a stacked bar code, a DataMatrix code, and a PDF417 code.

A housing 24 houses and/or supports the time-varying nonpredictable code generator 12 and the display device 14. The housing 24 is preferably sized for carrying within a wallet, a purse, or a pocket of an end user. For this purpose, it is preferred that the housing 24 be card shaped. In this case, for example, the housing 24 can have the size of a credit card, a business card, a smart card, an index card, a trading card, or a playing card. For carrying within a wallet or a purse, it is preferred that the housing 24 has at least one dimension, and preferably two or more dimensions, sized as a credit card or the like.

A power source 26 powers the time-varying nonpredictable code generator 12 and the display device 14. The power source 26 is housed and/or supported by the housing 24. Preferably, the power source 26 includes a solar cell or a battery. Alternatively, the power source 26 can include a plastic battery. If desired, the plastic battery can be integrated with or incorporated into the housing 24.

An optical reader 30 reads the time-varying nonpredictable machine-readable code 16 and generates a signal representative thereof. Examples of the optical reader 30 include but are not limited to a printed code reader, a bar code reader, a scanning beam reader, a linear CCD (charge coupled device) reader, or a two-dimensional CCD reader.

The signal representative of the time-varying nonpredictable machine-readable code 16 is communicated from the optical reader 30 to a communication unit 32. Examples of the communication unit 32 include but are not limited to a computer having a modem, a computer having a network adapter, a telephone, a cellular telephone, a personal communication system (PCS) telephone, a cable modem, a two-way pager, and a wireless data transceiver.

The communication unit 32 communicates a signal representative of the time-varying nonpredictable machine-readable code 16 to a communication unit 34. Examples of the communication unit 34 include the aforementioned examples of the communication unit 32. The communication units 32 and 34 can communicate via any one or more of: (i) an electronic network such as the Internet, an intranet, a local area network, or a wide area network; (ii) a telephone network such as a public switched telephone network, a cellular telephone network, or a PCS telephone network; (iii) a television network such as a cable television system; (iv) a paging network such as a local paging network, a regional paging network, a national paging network, or a global paging network; (v) a wireless data network such as a satellite data network or a local wireless data network.

The communication unit 34 communicates a signal associated with the time-varying nonpredictable machine-readable code 16 to the verification computer 22. The verification computer 22 compares the time-varying nonpredictable machine-readable code 16 to a code generated by the second code generator 20.

If the time-varying nonpredictable machine-readable code 16 is valid, the verification computer 22 initiates a first action. The first action can include communicating a message, such as a message indicating approval of a transaction, a message which enables access to an electronic network, a message which enables access to a physical entity such as a room or a storage place, or a message associated with identification of the end user. The message can be communicated from the communication unit 34 to the communication unit 32 or to another communication unit 36. Other actions which can be initiated by the verification computer 22 are given in the aforementioned patents incorporated by reference into this disclosure.

If the time-varying nonpredictable machine-readable code 16 is invalid, the verification computer 22 initiates a second action. The second action can include communicating a message, such as a message indicating disapproval of a transaction, a message which inhibits access to an electronic network, or a message which inhibits access to a physical entity such as a room or a storage place. The message can be communicated from the communication unit 34 to the communication unit 32 or to another communication unit 36.

Optionally, the code display apparatus 10 further includes a memory 38 having at least one prestored code and an input device 40 such as a button. The memory 38 and the input device 40 are supported or housed by the housing 10.

The at least one prestored code can include any combination of codes which encode user identification information such as a name, an address, a social security number, a driver's license number, and an insurance number, and codes associated with a resource or a destination in an electronic network. In response to a user-initiated input received by the input device 40, the display device 14 displays one of the prestored codes. Preferably, the prestored code is displayed in the form of a bar code. By repeatedly depressing the button, the end user can cycle through all of the prestored codes and return to displaying a time-varying code.

Figure 2:
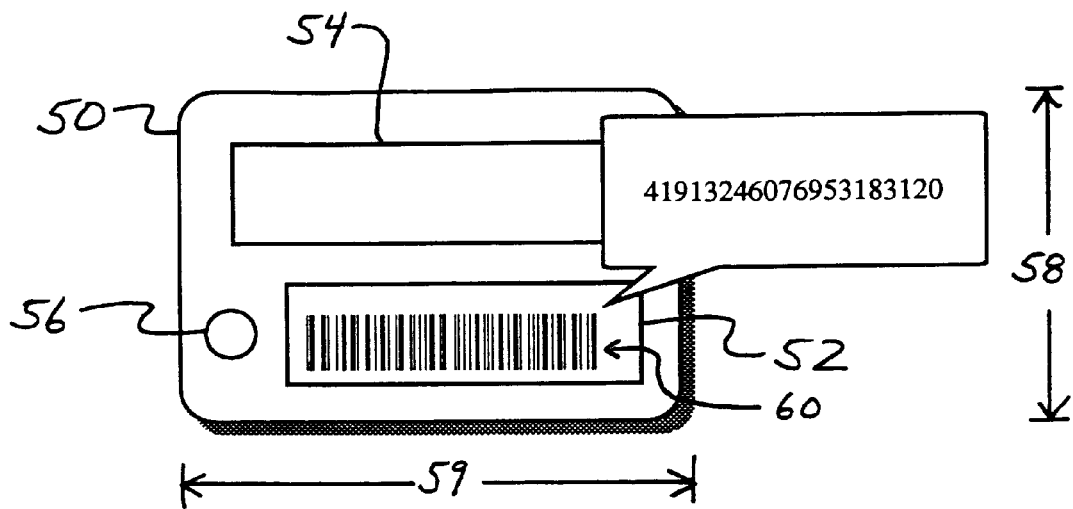
FIG. 2 is a general diagram that illustrates a first embodiment of a code display apparatus in accordance with the present invention.

FIG. 2 is an illustration of a first embodiment of a code display apparatus in accordance with the present invention. The code display apparatus includes a card-shaped housing 50 which houses and/or supports a time-varying nonpredictable code generator (not specifically illustrated), a display device such as a liquid crystal display 52 responsive to the time-varying nonpredictable code generator, a solar battery 54 to power the time-varying nonpredictable code generator and the liquid crystal display 52, and an optional power button 56 to activate and deactivate at least one of the time-varying nonpredictable code generator and the liquid crystal display 52, and to cycle through prestored codes. The card-shaped housing 50 has a length 59 and a width 58 sized as a credit card or the like.

The code display apparatus is illustrated in operation at a first instance of time. At the first time, the time-varying nonpredictable code generator provides a first pseudorandom sequence of characters. For purposes of illustration, the first pseudorandom sequence includes a first pseudorandom sequence of numerals "41913246076953183120".

The liquid crystal display 52 displays a bar code representation 60 of the first pseudorandom sequence. The bar code representation 60 is illustrated in accordance with the Code 93 bar code standard. It is noted, however, that the bar code representation 60 can be formed in accordance with other bar code standards such as those previously described.

Figure 3:
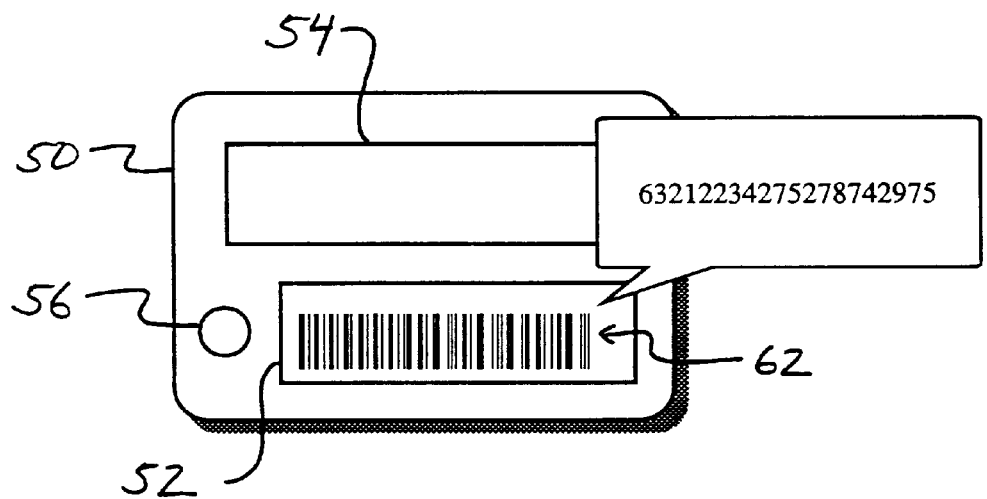
FIG. 3 is a general diagram that illustrates the first embodiment of the code display apparatus of FIG. 2 in operation at a second time.

FIG. 3 is an illustration of the first embodiment of the code display apparatus of FIG. 2 in operation at a second time. The second time is an instance of time subsequent to the first time depicted in FIG. 2. At the second time, the time-varying nonpredictable code generator provides a second pseudorandom sequence of characters. For purposes of illustration, the second pseudorandom sequence includes a second pseudorandom sequence of numerals "632122342752787242975".

The liquid crystal display 52 displays a bar code representation 62 of the second pseudorandom sequence. The bar code representation 62 is displayed in accordance with the same bar code standard, namely the Code 93 bar code standard, used at the first time.

In summary, the first embodiment of the code display apparatus periodically updates a bar code representation displayed by the liquid crystal display 52 in dependence upon a code generated by the time-varying nonpredictable code generator. The bar code representation can be updated at two-second intervals, five-second intervals, ten-second intervals, or other suitable time intervals. The bar code representation is read by the optical reader 30 during one of the aforementioned intervals. Since the optical reader 30 can typically read the bar code representation faster than an end user can manually enter (e.g. type) a corresponding sequence of numerals, the displayed bar code can be updated more rapidly than human-readable codes that must be entered manually.

Figure 4:
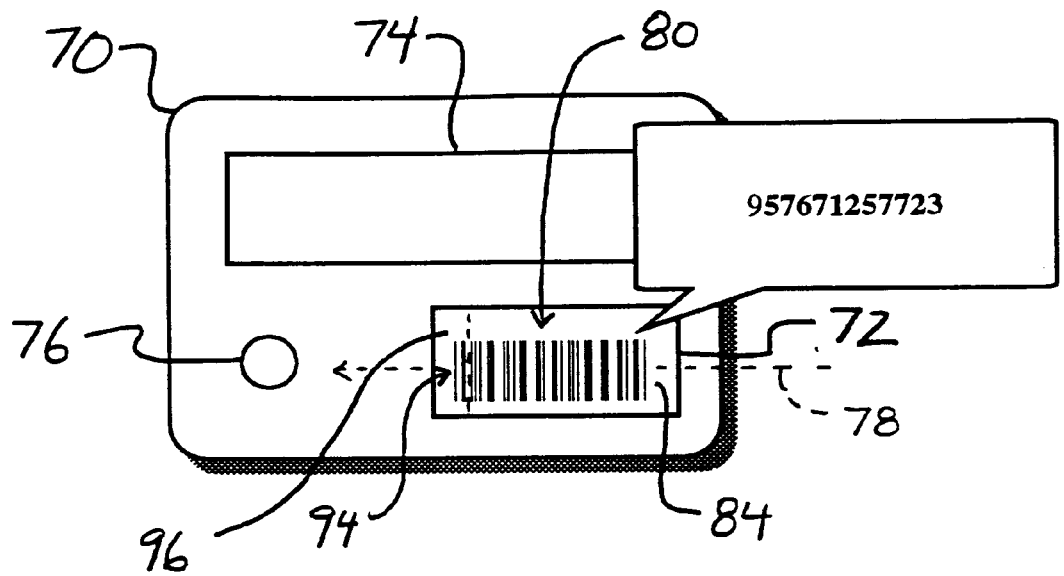
FIG. 4 is a general diagram that illustrates a second embodiment of a code display apparatus in accordance with the present invention.

FIG. 4 is an illustration of a second embodiment of a code display apparatus in accordance with the present invention. The code display apparatus includes a card-shaped housing 70 which houses and/or supports a time-varying nonpredictable code generator (not specifically illustrated), a display device such as a liquid crystal display 72 responsive to the time-varying nonpredictable code generator, a solar battery 74 to power the time-varying nonpredictable code generator and the liquid crystal display 72, and an optional power button 76 to activate and deactivate at least one of the time-varying nonpredictable code generator and the liquid crystal display 72.

In this embodiment, the display device functions as a bar code scrolling display. In particular, the liquid crystal display 72 scrolls a time-varying nonpredictable bar code across a dimension 78.

The code display apparatus is illustrated in operation at a first instance of time. At the first time, the time-varying nonpredictable code generator provides a first pseudorandom sequence of characters. For purposes of illustration, the first pseudorandom sequence includes a first pseudorandom sequence of numerals "957671257723".

The liquid crystal display 72 displays a bar code representation 80 of the first pseudorandom sequence. The bar code representation 80 is illustrated in accordance with the Code 93 bar code standard. It is noted, however, that the bar code representation 80 can be formed in accordance with other bar code standards such as those previously described.

Figure 5:
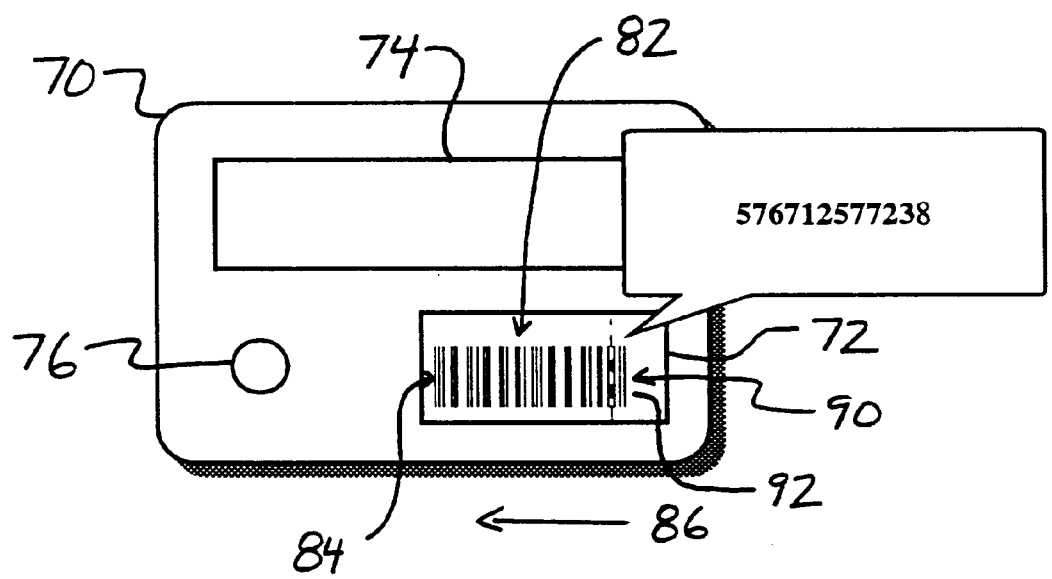
FIG. 5 is a general diagram that illustrates the second embodiment of the code display apparatus of FIG. 4 in operation at a second time.

FIG. 5 is an illustration of the second embodiment of the code display apparatus of FIG. 4 in operation at a second time. The second time is an instance of time subsequent to the first time depicted in FIG. 4. At the second time, the time-varying nonpredictable code generator provides a second pseudorandom sequence of characters. For purposes of illustration, the second pseudorandom sequence includes a second pseudorandom sequence of numerals "576712577238". The second pseudorandom sequence includes the first pseudorandom sequence with the numeral "9" removed from its beginning, and a pseudorandomly-generated numeral "8" appended to its end. Hence, both the first pseudorandom sequence and the second pseudorandom sequence include a subsequence of numerals "5761257723".

The liquid crystal display 72 displays a bar code representation 82 of the second pseudorandom sequence. The bar code representation 82 is displayed in accordance with the same bar code standard, namely the Code 93 bar code standard, used at the first time.

The bar code representation 82 includes at least one bar 84 of the bar code representation 62 shifted in a direction 86. In this example, the at least one bar 84 corresponds to the subsequence of numerals "5761257723".

The bar code representation 82 also includes at least one bar 90 appended to an end 92 of the bar code representation 62. In this example, the at least one bar 90 corresponds to the numeral "8".

Further, at least one bar 94 from an end 96 of the bar code representation 62 is excluded or removed from the bar code representation 82. In this example, the at least one bar 94 corresponds to the numeral "9".

It is noted that between the first time depicted in FIG. 4 and the second time depicted in FIG. 5, it is preferred that a plurality of intermediate steps of removing, shifting, and/or appending at least one bar to the displayed bar code be performed. Each intermediate step can comprise steps of excluding or removing at least one pixel from a first end of a bar code, shifting a portion of the bar code one or more pixels over toward the first end, and/or appending at least one pixel to a second end of the bar code. Using the example described with reference to FIGS. 4 and 5, the intermediate bar codes would include an incomplete portion of the bar code for "9" at the first end, a shifting portion of the bar code for "5761257723", and an incomplete portion of the bar code for "8".

In summary, the second embodiment of the code display apparatus displays a scrolling bar code based upon a code generated by the time-varying nonpredictable code generator. The bar code representation can be scrolled at shorter time intervals than for the first embodiment. For example, the steps of removing, shifting, and/or appending at least one bar can be repeated at subsecond intervals such as a tenth-of-a-second interval or another suitable time interval. Advantageously, the end user reads a bar code representation by placing a bar code wand or the like at a fixed location at the display device. The bar code representation scrolls across the bar code wand in a manner which emulates the end user swiping the bar code wand across a fixed bar code.

Figure 6:
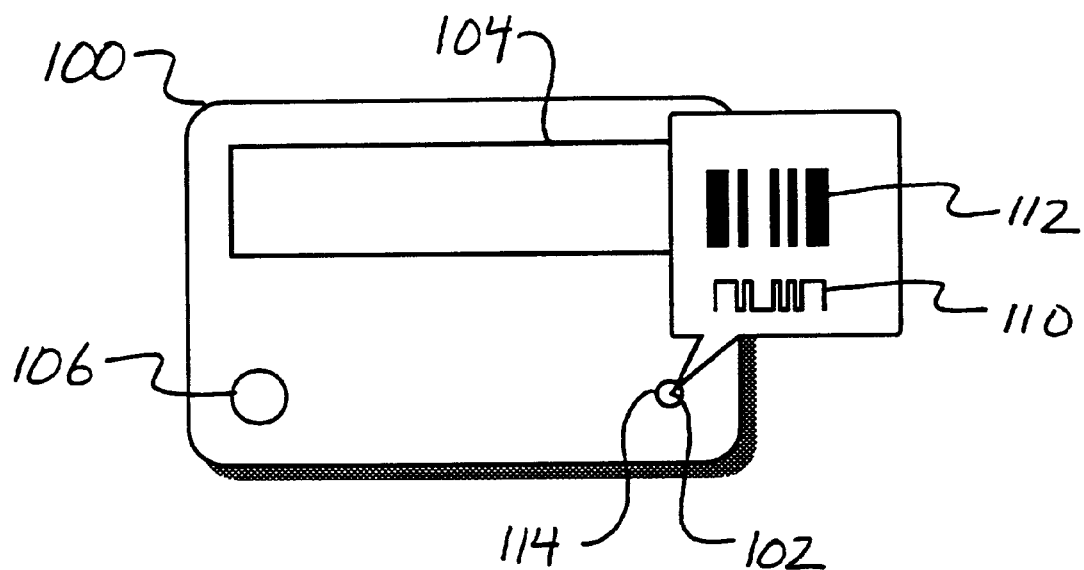
FIG. 6 is a general diagram that illustrates a third embodiment of a code display apparatus in accordance with the present invention.
Figure 1:
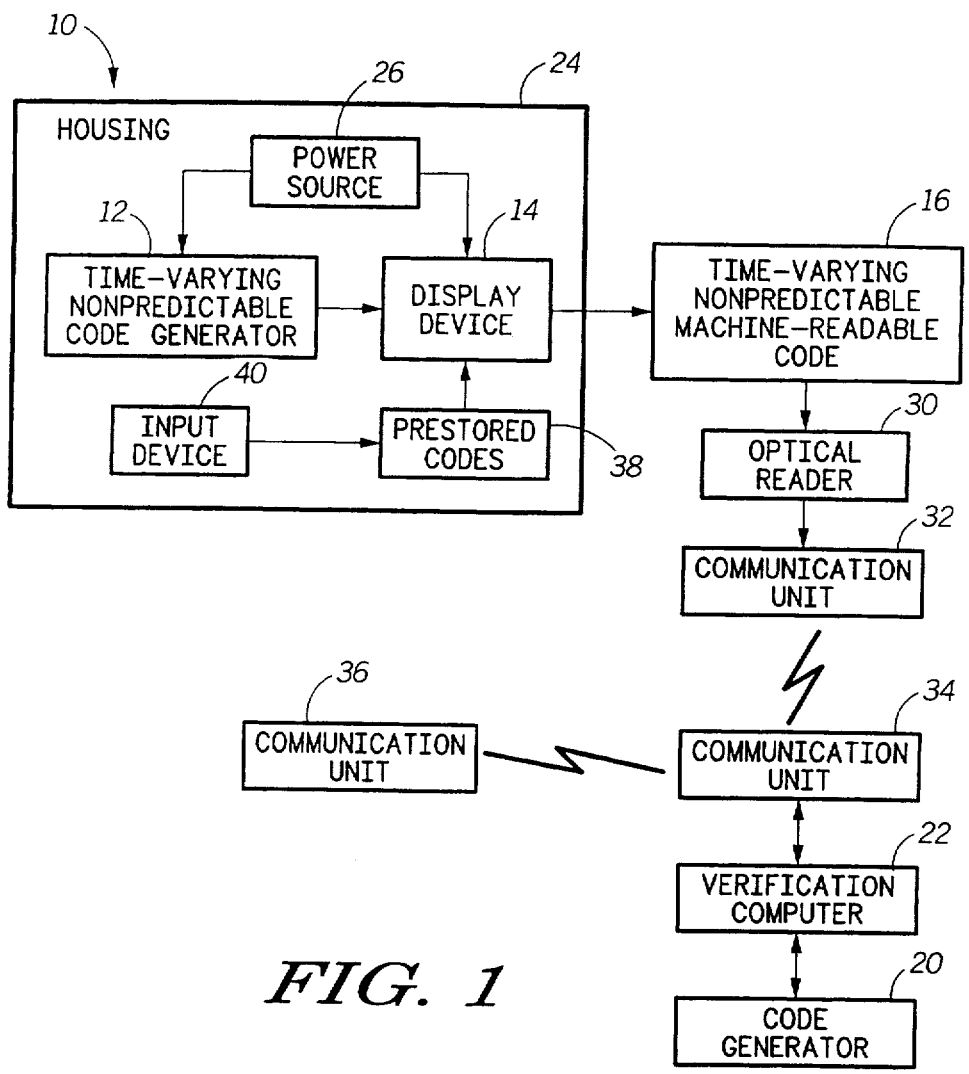
Figure 2:
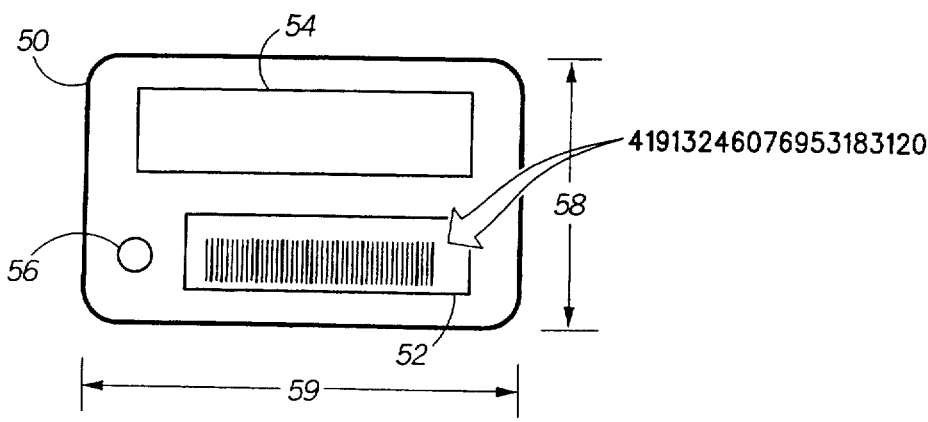
Figure 3:
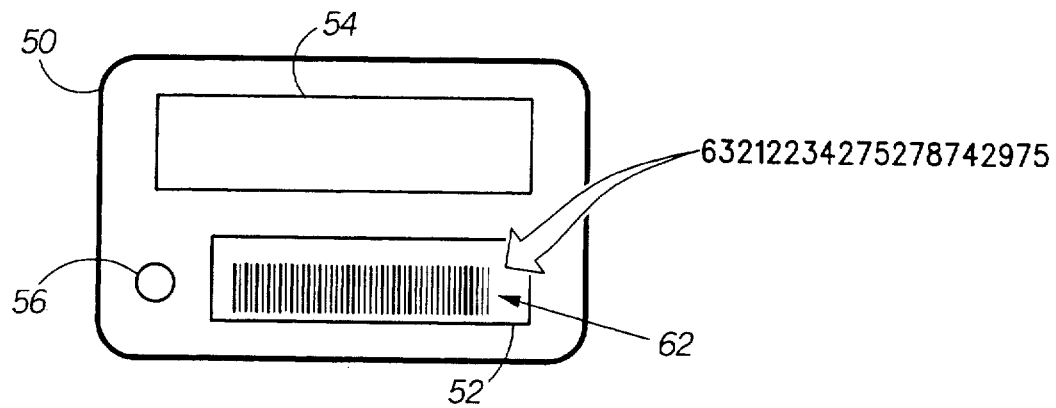
Figure 4:
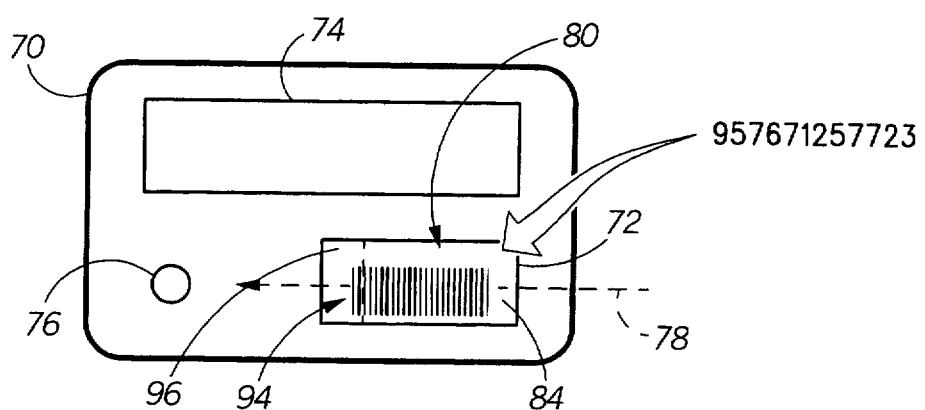
Figure 5:
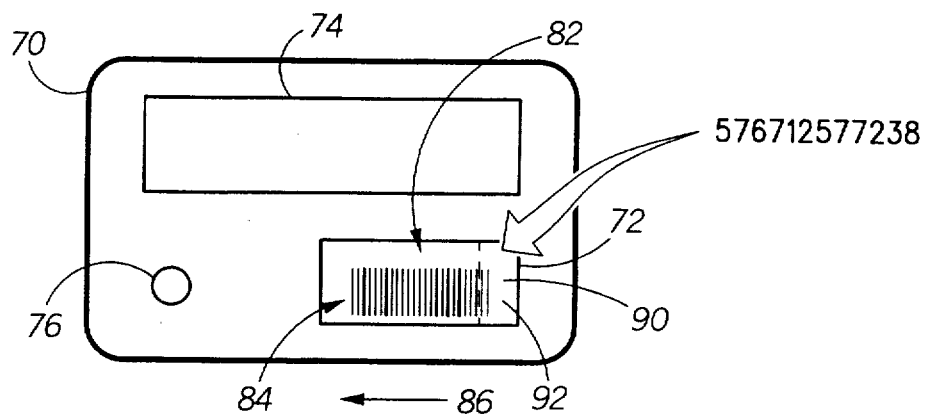
Figure 6:
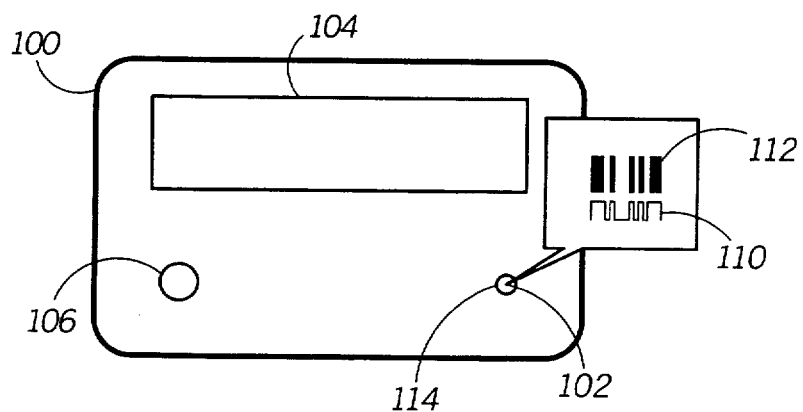

FIG. 6 is an illustration of a third embodiment of a code display apparatus in accordance with the present invention. The code display apparatus includes a card-shaped housing 100 which houses and/or supports a time-varying nonpredictable code generator (not specifically illustrated), at least one display element 102 such as at least one liquid crystal display element responsive to the time-varying nonpredictable code generator, a solar battery 104 to power the time-varying nonpredictable code generator and the at least one display element 102, and an optional power button 106 to activate and deactivate at least one of the time-varying nonpredictable code generator and the at least one display element 102.

The at least one display element 102 displays a pulsed signal 110 corresponding to a bar code representation 112 of the time-varying nonpredictable code. The bar code representation 112 is formed in accordance with a bar code standard such as the standards previously described. Dependent upon the bar code standard, the pulsed signal 110 can have pulse widths and/or pulse positions which are modulated in dependence upon the bar code representation 112.

The card-shaped housing 100 includes an inset portion 114 at which the at least one display element 102 is accessible. The inset portion 114 receives and temporarily retains an end of a bar code wand or a like optical reader. Other means for receiving and retaining the end of the bar code wand can be used, such as a wall which surrounds at least a portion (and preferably all) of the at least one display element 102.

In summary, the third embodiment of the code display apparatus displays a pulsed signal based upon a code generated by the time-varying nonpredictable code generator. Preferably, the pulsed signal has pulse widths less than one second, and more preferably, less than a tenth of a second. Advantageously, the end user reads a pulsed representation of a bar code by placing a bar code wand or the like at the inset portion 114. The bar code representation is communicated to the bar code wand in a manner which emulates the end user swiping the bar code wand across a fixed bar code.

It is noted that as an alternative to displaying time-varying nonpredictable codes, each of the embodiments of the code display apparatus described herein can be used to display bar codes indicative of other types of information. For example, the code display apparatus can display a bar code associated with a resource or a destination in an electronic network. The bar code can include an electronic address to identify the resource. The electronic address can include at least a portion of (and preferably all of) a URL (Uniform Resource Locator), a URN (Uniform Resource Name), or an IP (Internet Protocol) address.

The bar code can be read by an optical reader to link to the resource and/or to download information from the electronic network. The information can include personal information, medical information, and/or an image of the end user. In general, the bar code can be read to link a network access apparatus to a destination in the electronic network in accordance with the teachings in the copending applications incorporated by reference into this disclosure.

Other information which can be displayed by the code display apparatus includes any of the information associated with embodiments of a network navigation device described in the copending applications incorporated by reference into this disclosure.

Thus, there has been described herein several embodiments including preferred embodiments of a bar code display apparatus.

Because the various embodiments of the present invention display a time-varying bar code rather than a time-varying human-readable code, they provide a significant improvement in hindering interception of a personal identification code by an unauthorized viewer of the apparatus.

Additionally, the various embodiments of the present invention as herein-described provide a bar code scrolling display and a bar code pulsing display to communicate a bar code to a fixed bar code reader. These displays advantageously reduce a width of a display device to display a bar code.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

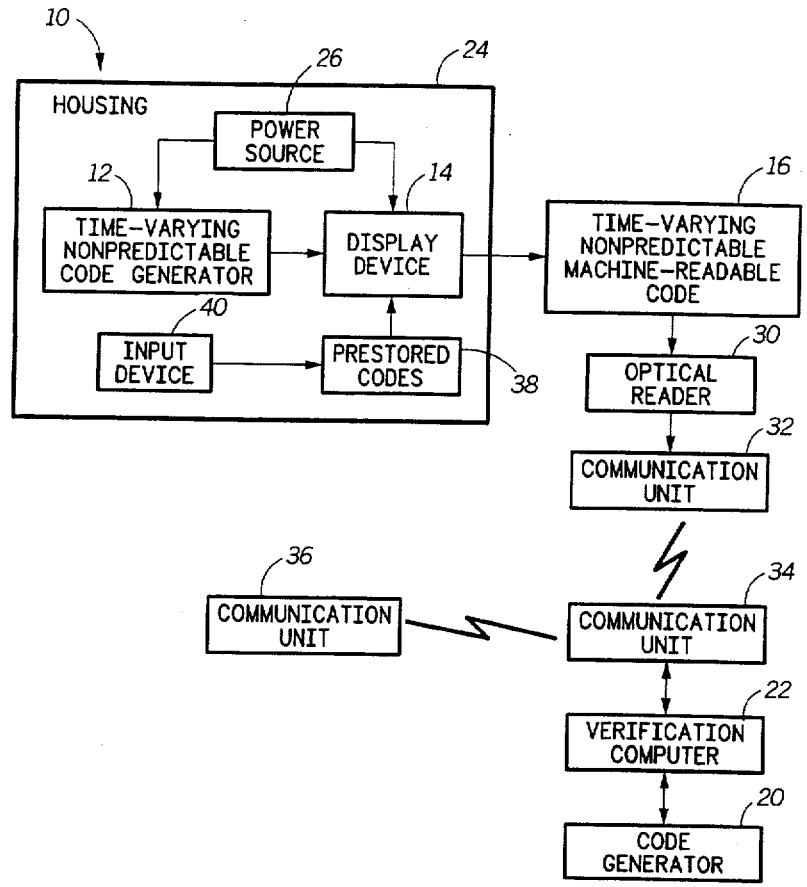

What is claimed is:

1. An apparatus comprising:

a time-varying nonpredictable code generator;

a scrolling display device responsive to the time-varying nonpredictable code generator to display a time-varying nonpredictable bar code wherein the bar code scrolling display displays a first bar code at a first time and a second bar code at a second time, the second bar code having a bar removed from an end of the first bar code;

a housing to support the time-varying nonpredictable code generator, the housing having an inset portion at which the display device is accessible.

2. The apparatus of claim 1 wherein the time-varying nonpredictable code generator is synchronized to a second code generator.

3. The apparatus of claim 1 wherein the bar code scrolling display includes a liquid crystal display.

4. The apparatus of claim 1 wherein the pulsed signal corresponds to a bar code selected from the group consisting of a 3 of 9 bar code, a UPC bar code, a Code 128 bar code, a Codabar bar code, an MSI bar code, an Extended 3 of 9 bar code, a Code 93 bar code, an Extended Code 93 bar code, an Industrial 2 of 5 bar code, a Standard 2 of 5 bar code, a Code 11 bar code, a UCC bar code, and an EAN/JAN bar code.

5. The apparatus of claim 1 wherein the pulsed signal includes a pulse-width modulated signal.

6. The apparatus of claim 1 wherein the bar code scrolling display displays the second bar code to have at least one bar of the first bar code shifted in a direction.

* * * * *

UNITED STATES PATENT AND TRADEMARK OFFICE
CERTIFICATE OF CORRECTION

PATENT NO. : 5,939,699
DATED : Aug. 17, 1999
INVENTOR(S) : Cary D. Perttunen, et al It is certified that error appears in the above-identified patent and that said Letters Patent is hereby corrected as shown below:

On title page, "4 Drawing Sheets" should read --3 Drawing Sheets--

The title page, should be deleted to be replaced with the attached title page.

The drawing sheets, consisting of Figs. 1, 2, 3, 4, 5, and 6, should be deleted to be replaced with the drawing sheets, consisting of Figs. 1, 2, 3, 4, 5 and 6 as shown on the attached pages.

Signed and Sealed this

Thirtieth Day of May, 2000

Attest:

Q. TODD DICKINSON

Attesting Officer      Director of Patents and Trademarks

United States Patent [19]

Perttunen et al.

[11] Patent Number: 5,939,699
[45] Date of Patent: Aug. 17, 1999

[54] BAR CODE DISPLAY APPARATUS

[75] Inventors: Cary D. Perttunen, Shelby Township, Mich.; George N. Maracas, Phoenix, Ariz.; William L. Reber, Rolling Meadows, Ill.

[73] Assignee: Motorola, Inc., Schaumburg, Ill.

[21] Appl. No.: 08/864,135

[22] Filed: May 28, 1997

[51] Int. Cl.⁶ .................................................. G06K 7/10
[52] U.S. Cl. ............................ 235/462.01; 235/487
[58] Field of Search ........................... 235/462.01, 378, 235/383, 385, 466, 492, 487; 345/123, 56

[56] References Cited

U.S. PATENT DOCUMENTS

| | | | |
|---|---|---|---|
| 4,358,761 | 11/1982 | Iwasaki | 340/792 |
| 4,667,087 | 5/1987 | Quintana | 235/380 |
| 4,868,376 | 9/1989 | Lessin et al. | 235/492 |
| 5,166,499 | 11/1992 | Holland et al. | 235/376 |
| 5,450,491 | 9/1995 | McNair | 380/25 |
| 5,594,493 | 1/1997 | Nemirofsky | 235/380 |
| 5,789,732 | 8/1998 | McMahon et al. | 235/487 |

FOREIGN PATENT DOCUMENTS 401229390 3/1988 Japan ................................. 235/487

*Primary Examiner*—Donald Hajec
*Assistant Examiner*—Diane I. Lee
*Attorney, Agent, or Firm*—Jeffrey G. Toler; James E. Gauger

[57] ABSTRACT

A bar code display apparatus includes a time-varying nonpredictable code generator (12) and a display device (14) responsive to the time-varying nonpredictable code generator (12) to display a time-varying nonpredictable bar code. The display device can provide a scrolling display by displaying a subsequent bar code portion having a bar removed from an end of the bar code. Alternatively, the display device can display a pulsed signal corresponding to the bar code. A housing, having an inset portion at which the display device is accessible, can support the time-varying nonpredictable code generator and the display device.

6 Claims, 4 Drawing Sheets